(12) United States Patent
Gosselin et al.

(10) Patent No.: US 6,729,202 B2
(45) Date of Patent: May 4, 2004

(54) CARTESIAN PARALLEL MANIPULATORS

(75) Inventors: Clément Gosselin, Sillery (CA); Xianwen Kong, Sainte-Foy (CA)

(73) Assignee: Université Laval, Sainte-Foy (CA)

( * ) Notice: Subject to any disclaimer, the term of this patent is extended or adjusted under 35 U.S.C. 154(b) by 155 days.

(21) Appl. No.: 10/169,077

(22) PCT Filed: Apr. 10, 2002

(86) PCT No.: PCT/CA02/00509
§ 371 (c)(1),
(2), (4) Date: Jul. 8, 2002

(87) PCT Pub. No.: WO02/096605
PCT Pub. Date: Dec. 5, 2002

(65) Prior Publication Data
US 2003/0121351 A1 Jul. 3, 2003

(30) Foreign Application Priority Data
May 31, 2001 (CA) .............................................. 2349655

(51) Int. Cl.[7] ................................................. B25J 17/00
(52) U.S. Cl. ........................... 74/490.05; 901/2; 901/16
(58) Field of Search ...................... 74/490.05, 490.01; 901/14, 16, 2

(56) References Cited

U.S. PATENT DOCUMENTS

| | | | |
|---|---|---|---|
| 4,976,582 A | 12/1990 | Clavel | |
| 5,156,062 A | 10/1992 | Appleberry | |
| 5,673,595 A | * 10/1997 | Hui et al. | ................. 74/490.05 |
| 6,105,455 A | * 8/2000 | Rosheim | ................. 74/490.06 |
| 6,543,987 B2 | * 4/2003 | Ehrat | ......................... 414/735 |
| 6,557,432 B2 | * 5/2003 | Rosheim | ................. 74/490.05 |
| 6,602,042 B2 | * 8/2003 | Roy et al. | ................... 414/735 |
| 2003/0121351 A1 | * 7/2003 | Gosselin et al. | ......... 74/490.05 |

FOREIGN PATENT DOCUMENTS

| | | |
|---|---|---|
| EP | 0 263 627 | 4/1988 |
| EP | 0 494 565 | 7/1992 |

OTHER PUBLICATIONS

Arai, Tatsuo, Hervé, Jacques M. Tanikawa, Tamio, "*Development of 3 DOF Micro Finger*," Proceedings of International Conference on Itelligent Robots and Systems, Osaka, Japan, Nov. 1996.

Hervé, J.M., Sparacino, F., "*Structural Synthesis of 'Parallel' Robots Generating Spatial Translation*," Proceedings of International Conference on Advanced Robotics, Pisa, Italy, Jun. 1991, pp. 808–813.

Hervé, Jacques M., "*Design of Parallel Manipulators via the Displacement Group*," Proceedings of Ninth World Congress on the Theory of Machines and Mechanisms, Milan, Italy, Aug.–Sep. 1995.

(List continued on next page.)

*Primary Examiner*—David Fenstermacher
(74) *Attorney, Agent, or Firm*—Ogilvy Renault; Pierre T. Nguyen (57) ABSTRACT

A manipulator having three support legs each extending between the platform and a ground. The support legs are connected to the ground by a first joint member and to the platform by a second joint member, and these joint members are interconnected by a third joint member. The support legs each have a rotational degree of freedom and have constraints in the joint members operable to restrict the platform to translational motion and to constrain a relationship between linear displacement of the first joint members and output of the platform to be linear. With three actuators each controlling exclusively one of three translational degrees of freedom of the platform, the manipulator is said to be decoupled. With the relationship being equal for a linear displacement of any one of the first joint members and a displacement output of the platform, the decoupled manipulator is said to be isotropic.

14 Claims, 4 Drawing Sheets

OTHER PUBLICATIONS

Zhao, Tie Shi, Huang, Zhen, "*A Novel Three–DOF Translational Platform Mechanism and Its Kinematics*," Proceedings of ASME 2000 Design Engineering Technical Conferences and Computers and Information in Engineering Conference, Baltimore, Maryland, Sep. 2000.

Frisoli, A., Checcacci, D., Salsedo, F., Bergamasco, M., "*Synthesis by Screw Algebra of Translating In–Parallel Actuated Mechanisms*," Proceedings of 7th International Symposium on Advances in Robot Kinematics, Piran–Portoroz, Slovenia, Jun. 2000.

Carricato, Marco, Parenti–Castelli, Vincenzo, "*A Family of 3–DOF Translational Parallel Manipulators*," Proceedings of ASME 2001 Design Engineering Technical Conference and Computers and Information in Engineering Conference, Pittsburgh, Pennsylvania, Sep. 2001.

Kim, Doik, "*Rate Kinematics of Spatial 3–DOF Manipulator*," excerpt (Chapter 5) from Ph.D. thesis entitled "*Kinematic Analysis of Spatial Parallel Manipulators: Analytical Approach*," Pohang University of Science and Technology (POSTECH), Pohang, Korea, 2002.

Tsai, Lung–Wen, "*Design of a Cartesian Parallel Manipulator*," Robotics and Machine Design Laboratory web page, http://www.engr.ucr.edu/~lwtsai/laboratory.htm.

\* cited by examiner

Fig. 4 are also parallel. An example of this is also illustrated in "A Family of 3-DOF Translational Manipulators," by M. Carricato and V. Parenti-Castelli.

The publication "Kinematic Analysis of Spatial Parallel Manipulators: Analytic Approach," by Doik Kim proposes a number of new generalized translational parallel mechanisms. One of the proposed architectures is based on three PRRRR legs. In each leg, the axes of the last three R-joints are mutually parallel but not parallel to the direction of the P-joint, and the second R-joint is skew to both the direction of the P-joint and the axes of the other three R-joints.

Finally, U.S. Pat. No. 5,156,062, issued in 1992 to Walter T. Appleberry, entitled "Anti-Rotation Positioning Mechanism," discloses a 3-URU (or 3-UPU) translational parallel mechanism.

In the creation of a manipulator, two factors are opposed. On one hand, the moving platform of the manipulator must be displaceable as freely as possible, with regard to the six degrees of freedom. On the other hand, the displacement of the moving platform must be readily calculable. One way to simplify this calculation is to constrain the moving platform to Cartesian movement by specific arrangements of the joint axes and proper selection of the joints to be actuated.

SUMMARY OF THE INVENTION

It is therefore an aim of the present invention to provide a translational parallel manipulator having a movable portion whose position is calculable in space according to the solution of a set of linear equations.

It is a further aim of the present invention to provide a method for controlling a displacement of the movable portion of the translational manipulator.

It is a still further aim of the present invention to provide a decoupled translational parallel manipulator.

It is a still further aim of the present invention to provide an isotropic decoupled translational parallel manipulator.

Therefore, in accordance with the present invention, there is provided a manipulator for receiving and displacing an object, comprising a moving portion, adapted for receiving the object; at least three articulated support legs each extending between the moving portion and a ground for supporting the moving portion, each of the articulated support legs being connected to the ground by a first joint member and to the moving portion by a second joint member, the first joint member and the second joint member in each of the articulated support legs being interconnected by at least a third joint member, the articulated support legs each having at least one rotational degree of freedom and having constraints in the joint members operable to restrict movement of the moving portion to three translational degrees of freedom and to constrain a relationship between linear displacement of the first joint members and output of the moving portion to be linear; and at least three linear actuators being each operatively connected to a different one of the first joint members for controlling the movement of the moving portion in any of the three translational degrees of freedom.

Also in accordance with the present invention, there is provided a method for controlling movement of a moving portion of a manipulator in any of three translational degrees of freedom, comprising the steps of providing a manipulator having a moving portion being supported by at least three articulated support legs each extending between the moving portion and a ground, each of the articulated support legs being connected to the ground by a first joint member and to the moving portion by a second joint member, the first joint member and the second joint member of each of the articulated support legs being interconnected by at least a third joint member, the articulated support legs each having at least one rotational degree of freedom and having constraints in the joint members operable to restrict movement of the moving portion to three translational degrees of freedom and to constrain of the relationship between linear displacement of the first joint members and output of the moving portion to be linear; providing at least three linear degrees of actuation to the manipulator by connecting an actuator to each of the first joint members; receiving a displacement signal for a given position of the moving portion; calculating control signals for the actuators of the first joint members using a linear function of said displacement signal; and displacing the moving portion to the given position by controlling the three degrees of actuation in accordance with said control signals.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
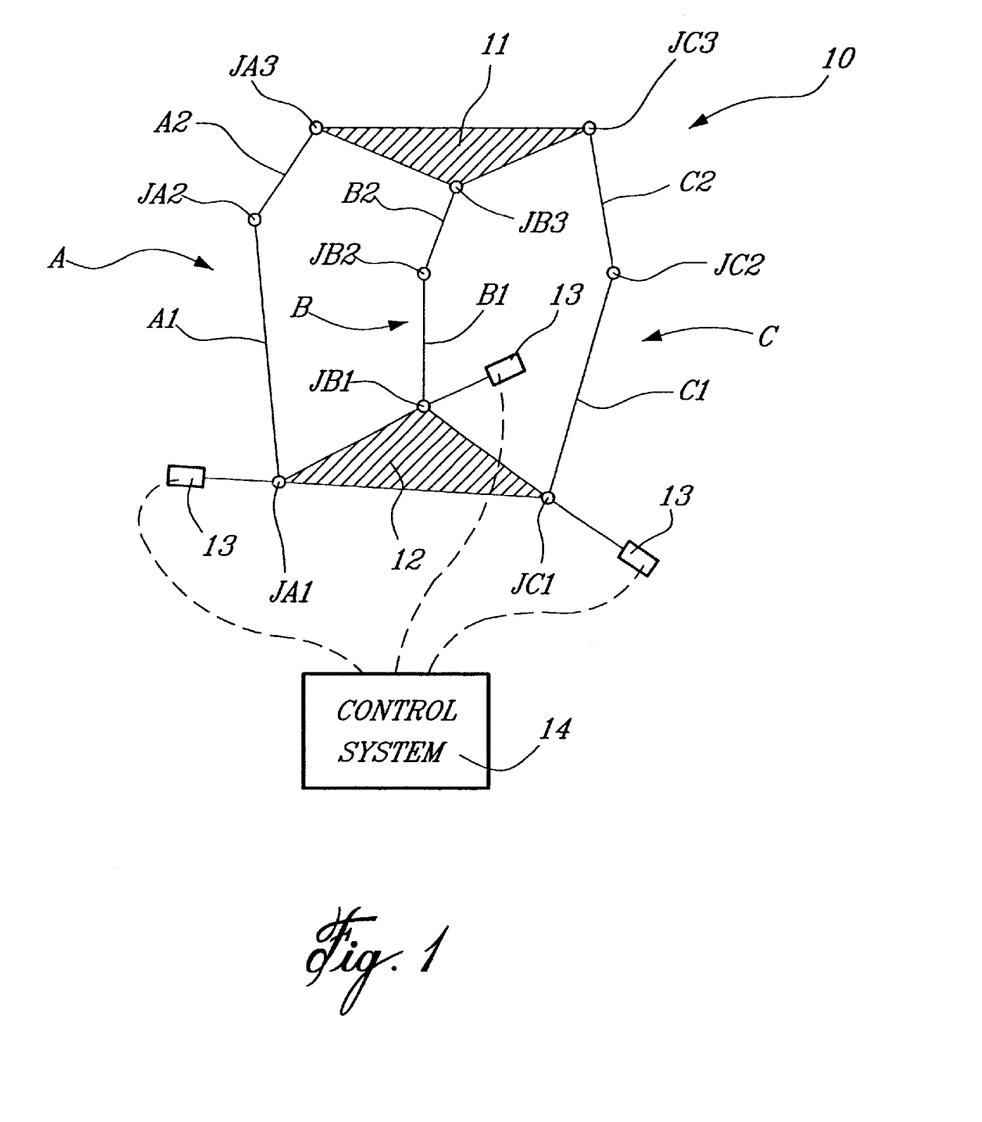
FIG. 1 is schematic front perspective view of the manipulator in accordance with the present invention.

According to the drawings and more particularly to FIG. 1, a translational parallel manipulator of the present invention is generally shown at 10 as a schematic representation of a structure. The present invention includes a plurality of embodiments each having this similar structure or a part of this structure. Consequently, FIG. 1 will be used for reference purposes. The translational parallel manipulator 10 comprises a moving platform 11, which may, for instance, be a moving platform adapted for supporting and displacing loads, carrying tools or the like, and for applications such as assembly, pick-and-place and machine loading.

In the translational parallel manipulator 10, the moving platform 11 is connected to a ground or base 12 by three legs, namely legs A, B and C. The legs A, B and C are each composed of two links. Namely, leg A comprises links A1 and A2. Link A1 is connected to the base 12 by joint JA1 and at an opposed end thereof to an end of link A2 by joint JA2. The opposed end of link A2 is connected to the moving platform 11 by joint JA3. Similarly, the link B1 is connected to the base 12 by joint JB1. The opposed end of link B1 is connected to a bottom end of link B2 by joint JB2, and a top end of link B2 is connected to the moving platform 11 by joint JB3. The leg C has its link C1 connected to the base 12 by joint JC1. The links C1 and C2 are interconnected by joint JC2. Finally, the link C2 of the leg C is connected to the moving platform 11 by joint JC3. It is pointed out that the above-mentioned joints may include combinations of joints that interact to create the equivalent of a joint.

The above-described joints are of various types according to various embodiments of the present invention. The joints will create constraints on the legs, and the constraints induced by the legs will restrict the moving platform 11 to motion in the three translational degrees of freedom (X, Y and Z), hence the name translational parallel manipulator. In other terms, any displacement of the moving platform 11 will involve the translation of each single one of its points by a same vector, by specific combinations of joints along with configuration conditions that will create the above-mentioned constraints. More specifically, the three rotational degrees of freedom are removed from the moving platform 11 by the addition of the constraints of each leg. Any one of the legs (i.e., A, B or C) of the parallel manipulator of the present invention removes at most two rotational degrees of freedom from the moving platform 11.

In a preferred embodiment of the present invention, the translational parallel manipulator has joints at Ji1 (with i=A, B and C) joining the base 12 to the first links i1 (i=A, B and C) that provide at least a translational degree of freedom so as to be actuated by linear actuators, as well as one or two rotational degrees of freedom in different directions. The translational parallel manipulator in accordance with the preferred embodiment of the present invention has revolute joints (R-joints) at Ji2 (i=A, B and C) to join the first links i1 to the second links i2 (i=A, B and C), and R-joints at Ji3 to join the second links i2 to the moving platform 11. Furthermore, the translational parallel manipulator 10 has three degrees of actuation, herein shown as being provided by actuators 13, which actuate the translational degree of freedom of the joints Ji1 and are thus positioned on and supported by the base 12. It is pointed out that other suitable actuation means, such as manual actuation, may be used with the translational parallel manipulators of the present invention, if they can provide the necessary linear degrees of actuation. The actuators 13 are interconnected to a control system 14, that may be used for calculating the inputs of the actuators 13 required for given displacements of the moving platform 11, and control the actuators 13 accordingly. The control system 14 may include user interfaces, such as keyboards, monitors, control devices, joysticks, such that a user may enter or command displacements of the moving platform 11 to given positions and orientations.

In order for the parallel manipulators 10 of the preferred embodiment to be restricted to translation motion, the rotational axes of the R-joints of each leg must be parallel to one rotational axis of the Ji1 joint (i=A, B, C) in the same leg, and the translation direction of each Ji1 joint (i=A, B, C) must not be perpendicular to the axes of R-joints Ji2 and Ji3. If there is one rotational degree of freedom in the joint Ji1, then at least two legs must have R-joint axes not parallel to each other (e.g., the R-joint axes of leg A must not be parallel to the R-joint axes of leg B). If there are two rotational degrees of freedom in the joint Ji1, then the lines that are perpendicular to the axes of rotation of the composite joints Ji1 (i=A, B, C) must not all be parallel to a same plane. The conditions limit the parallel manipulator 10 to a translational motion.

In a translational parallel manipulator of the present invention, the three legs (A, B and C) are characterized in that, when only one of the legs (A, B or C) is connected to the moving platform 11, and the actuated joint, namely Ji1 (with i=A, B or C), of the leg is blocked, the moving platform 11 will only translate along a plane, referred to as the primary plane, if the moving platform 11 is kept at a constant orientation. For each of the legs i (i=A, B and C), the relationship between the input displacement of each actuator and the output displacement along the corresponding direction is linear. The forward kinematic analysis and the inverse kinematic analysis are thus guaranteed to be linear too.

The parallel manipulators in accordance with the preferred embodiment of the present invention have two characteristics, which characteristics are herein defined as decoupling and isotropy. A translational parallel manipulator is said to be decoupled when each actuator controls exclusively one of the three translational degrees of freedom of the moving platform, with the three degrees of freedom being along three orthogonal directions. In the preferred embodiment of the present invention, the normals of the primary planes of each leg i are orthogonal to one another, and one of the normals is parallel to the X-axis, another to the Y-axis, and the remaining one to the Z-axis. Thus, each actuator controls exclusively one translational degree of freedom of the moving platform along the direction of X-axis, Y-axis or Z-axis. In addition, the relationship between the input displacement of each actuator, and the output displacement along the corresponding direction is linear, characterized by a reduction factor that remains constant.

If $\lambda_i$ (i=A, B, C) is a variable denoting the tracked distance by the linear input of the actuated joint in leg i (i=A, B, C), then the following input-output relationship is true:

$$x = K_A \lambda_A + C_A$$

$$y = K_B \lambda_B + C_B$$

$$z = K_C \lambda_C + C_C$$

where $C_i$ and $K_i$ (i=A, B, C) are constant, $K_i$ being the reduction factor, and x, y, z are the distances traveled by the moving platform 11 along the X-, Y- and Z-axes, respectively.

The decoupling characteristic facilitates the control of the displacement of the moving platform 11. As the reduction factor is constant, the displacement of the moving platform 11 in accordance with given increments of X, Y or Z translation can be achieved without knowing the position of the moving platform 11. Accordingly, the computational power required for performing displacements may be kept to a minimum, and real-time uses, such as controlling the displacement of the moving platform with a joystick, are contemplated.

A decoupled translational parallel manipulator is said to be isotropic when the reduction factor is the same for all legs. In other words, in the above-described equations, $K_A$ is equal to both $K_B$ and $K_C$. The equivalence of reduction factor ensures predictable results with respect to errors and tolerances. Isotropic parallel manipulators are accordingly recommended for uses requiring both precision and accuracy, and the parallel manipulators may be rated for use in a predetermined working volume, wherein the precision and accuracy remain within desired tolerances. Such uses include machining, microassembly (e.g., building a microstage or a manipulator), and medical robotics (e.g., building a robot to carry a microscope).

In theory, the decoupling and isotropy principles are illustrated by the Jacobian Matrix of the parallel manipulator that maps the vector of actuator velocities into the vector of output linear velocities. A decoupled parallel manipulator has a diagonal Jacobian Matrix, with the diagonal elements (i.e., reduction factors) being $\cos \alpha_x$, $\cos \alpha_y$ and $\cos \alpha_z$, with $\alpha_i$ (i=x, y, z) being the angle between the i-axis, which is parallel to the R-axes of a leg, and the linear displacement axis of the actuator. The decoupled parallel manipulator is isotropic if $|\cos \alpha_x|$, $|\cos \alpha_y|$, $|\cos \alpha_z|$ are equal.

In order for the kinematic analyses to be linear, the linear actuators 13 must be actuated under the condition that the axes of all R-joints being parallel to at least another R-joint axis in a same leg must not all be parallel to a same plane. This condition, joined to the condition that the translation direction of each P-joint must not be perpendicular to the at least two parallel rotational axes of its respective R-joints, will ensure a linear solution to both the forward and the inverse kinematic analyses of the translational parallel manipulator 10. To make the parallel manipulator decoupled, the following condition should be further met. The axes of all R-joints being parallel to at least another R-joint axis in a same leg of one leg should be perpendicular to those of the other legs.

Figure 2:
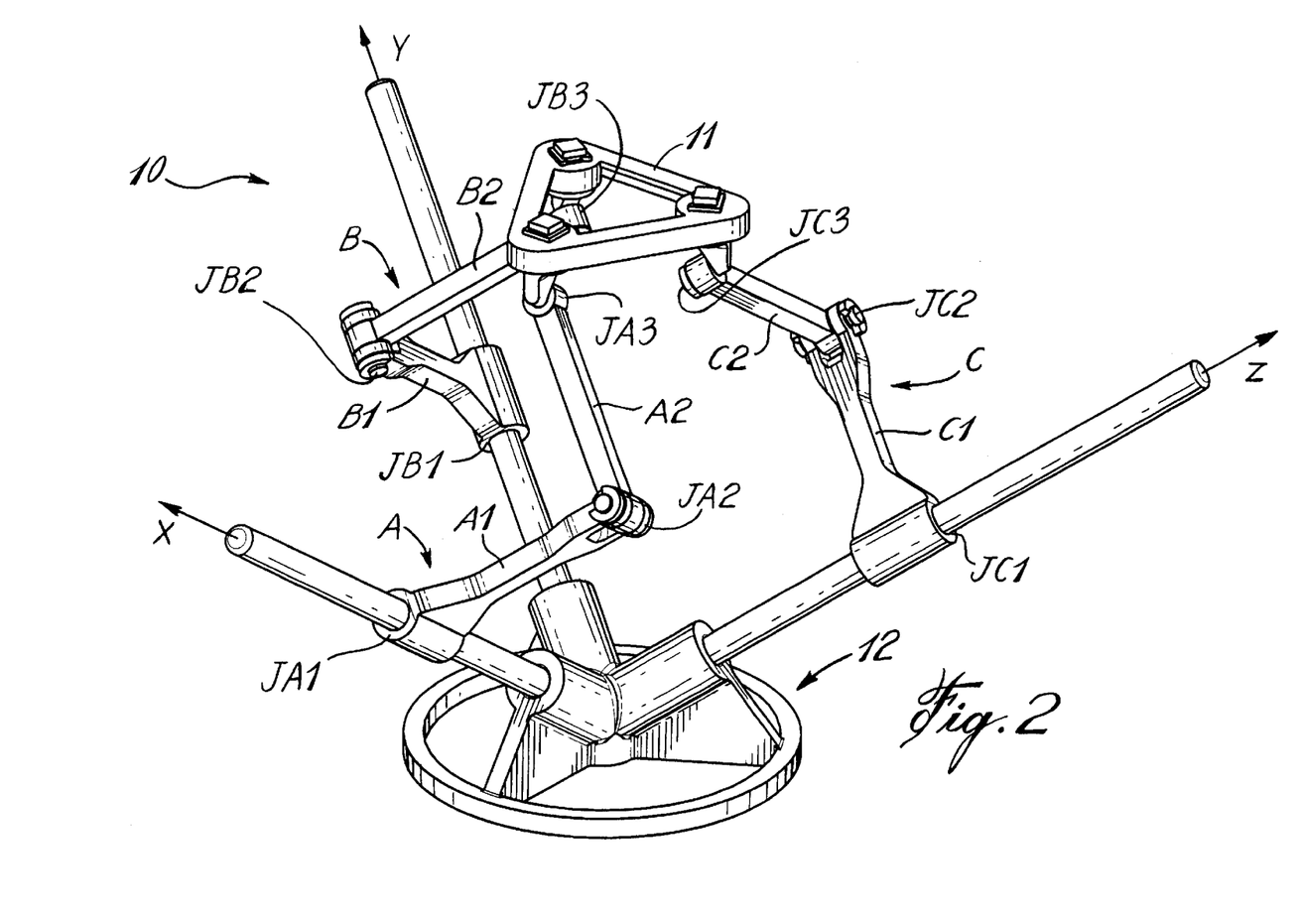
FIG. 2 is a perspective view of a first configuration of the preferred embodiment of the manipulator of the present invention.

Referring to FIG. 2, a first configuration of the preferred embodiment of the translational parallel manipulator 10 being decoupled and isotropic is illustrated having the 3-CRR configuration (i.e., with i=A, B and C, R-joints at Ji2 and Ji3, and C-joint at Ji1), with the axes of the R-joints at the moving platform 11 being in an orthogonal relationship with one another. In this optimal configuration, all axes of the joints in a leg are parallel to one another. Accordingly, the translation directions of the C-joints are orthogonal one to another. The parallel manipulator 10 has three degrees of actuation, which are linear actuators (not shown) that actuate the translation portion of each C-joint, namely in X, Y and Z.

For the 3-CRR parallel manipulator of FIG. 2, the reduction factors $K_i$ (i=A, B, C) are all equal to 1 for the parallel manipulator 10 of FIG. 2, with the three linear displacements being in orthogonal directions. The actuation is preferably provided by a piston of a cylinder mechanism, although plural types of actuation are suitable, such as manual actuation of the linear degrees of freedom. The workspace of the parallel manipulator 10 of FIG. 2 is generally in the shape of a cube.

In the 3-CRR embodiment illustrated in FIG. 2, the relationship between the linear displacement of the actuators 13 and the output displacement of the moving platform 11 is linear and both the forward kinematic analysis and the inverse kinematic analysis are accordingly linear. In fact, in this case, since we have decoupling with reduction factors all equal to 1, the inverse kinematics and the forward kinematics do not require any computations.

The C-joint of the CRR leg includes equivalent embodiments, such as an actuated P-joint displacing an R-joint. In such a case, the direction of the P-joint need not be parallel to the axis of the R-joint. In practice, the P-joint/R-joint configuration is used, for instance, in a machine tool to create an actuated C-joint, with the actuated P-joint being a linear motion guide. The actuated C-joint may be a strut actuator. Also, in another embodiment, the R-joints at Ji2 (I=A, B and C) may be replaced by P-joints.

Figure 3:
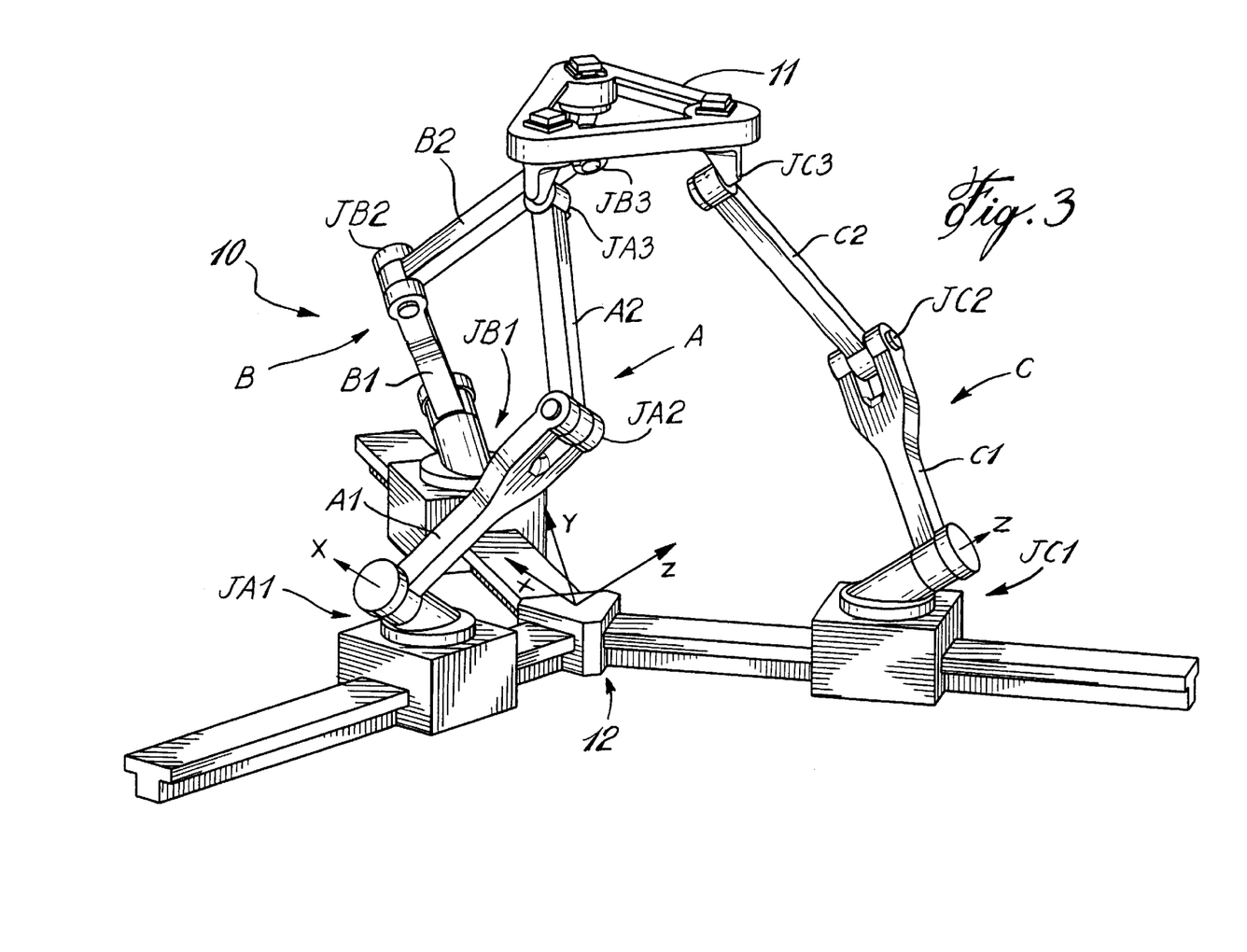
FIG. 3 is a perspective view of a second configuration of the preferred embodiment of the manipulator of the present invention.

Referring to FIG. 3, a second decoupled and isotropic configuration of the preferred embodiment of the parallel manipulator 10 is shown. The parallel manipulator 10 of FIG. 3 has a combination of a P-joint and an R-joint at Ji1 (with i=A, B and C), this providing a 3-PRRR parallel manipulator (i.e., with i=A, B and C, a P-joint and R-joint combination at Ji1, and R-joints at Ji1 and Ji3). The R-joints of each leg are parallel to one another, and the axes of all R-joints of a leg are orthogonal to the axes of the R-joints of the other legs. The P-joints are advantageous when compared to the parallel manipulator 10 of FIG. 2, as they are in a plane and may thus be supported by the base 12. Therefore, the risk of bending the linear joints' is reduced by this embodiment. The reduction factor $K_i$ (i=A, B, C) is equal to $$\sqrt{\frac{2}{3}}.$$

Figure 4:
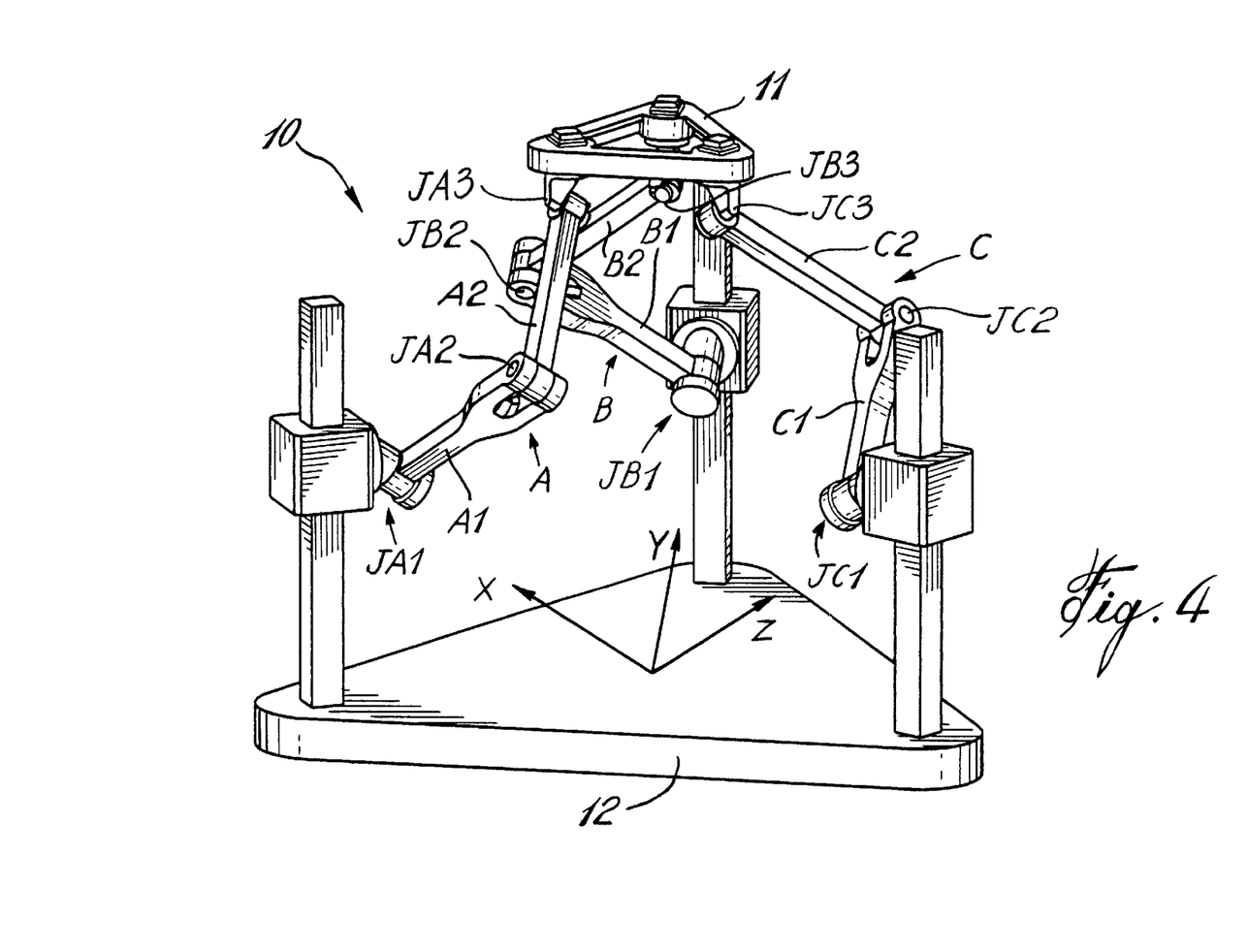
FIG. 4 is a perspective view of a third configuration of the preferred embodiment of the manipulator of the present invention.

Referring to FIG. 4, a third decoupled and isotropic configuration of the preferred embodiment of the parallel manipulator 10 is shown having legs of the type PRRR, i.e., with i=A, B and C, a combination of a P-joint and R-joint at Ji1, and R-joints at Ji2 and Ji3. The three sets of parallel axes of the R-joints of each of the legs are orthogonal. The translation directions of the P-joints are parallel to one another. The reduction factor $K_i$ (i=A, B, C) is equal to $$\sqrt{\frac{1}{3}}.$$

The parallel manipulator 10 in accordance with the third configuration is advantageous, as the workspace may be easily scaled in the vertical direction. When the moving platform 11 undergoes pure vertical motions (namely, in the same direction as the translation direction), all actuators move at the same rate. Therefore, the parallel manipulator 10 in accordance with the third embodiment is well suited for pick-and-place applications.

It is pointed out that helical joints (H-joints) and passive P-joints may be used in the manipulators described above. For instance, the R-joints can be replaced by H-joints, and the C-joints by a combination of a H-joint and an R-joint with parallel axes. The forward kinematic analysis and inverse kinematic analysis are linear as long as there exist three primary planes in the translational parallel manipulator and the relationship between the input displacement of each actuator and the output displacement along the corresponding direction is linear.

Also, the intermediate R-joint may be replaced by a passive P-joint. One condition is that the P-joint direction is parallel to the corresponding primary plane. However, the passive P-joints are impractical as the stroke they provide is a function of their size, and, as they are more prone to failure than R-joints, the R-joints remain an optimal solution by their simplicity.

It has also been thought to introduce inactive joints into the parallel manipulators. Inactive joints are joints that do not see motion between the components they link. The addition of inactive joints allows some over-constrained parallel manipulators to become statically determined, thereby facilitating their assembly and simplifying their dynamic analyses. However, adding inactive joints reduces the stiffness of the manipulators.

We claim:
1. A manipulator for receiving and displacing an object, comprising:
   a moving portion, adapted for receiving the object;
   at least three articulated support legs each extending between the moving portion and a ground for supporting the moving portion, each of the articulated support legs being connected to the ground by a first joint member and to the moving portion by a second joint member, the first joint member and the second joint member in each of the articulated support legs being interconnected by at least a third joint member, the articulated support legs each having at least one rotational degree of freedom and having constraints in the joint members operable to restrict movement of the moving portion to three translational degrees of freedom and to constrain a relationship between linear displacement of the first joint members and output of the moving portion to be linear; and at least three linear actuators being each operatively connected to a different one of the first joint members for controlling the movement of the moving portion in any of the three translational degrees of freedom.

2. The manipulator according to claim 1, wherein the second joint members are revolute joints, the axes of the revolute joints of the second joint members being orthogonal with one another.

3. The manipulator according to claim 1, wherein the second and third joint members each are revolute joints, the axes of the revolute joints in a same one of the legs are parallel to one another, and the axes of the revolute joints of the second joint members are orthogonal with one another.

4. The manipulator according to claim 3, wherein each of the first joint members is any one of a cylindrical joint with an axis parallel to the axes of the revolute joints of the same leg, and a combination of a revolute joint and of a prismatic joint with an axis of the revolute joint of the first joint member parallel to the axes of other ones of the revolute joints of a same one of the legs.

5. The manipulator according to claim 4, wherein each of the first joint member is said combination of a revolute joint and of a prismatic joint, with translation directions of the prismatic joints being parallel to one another.

6. The manipulator according to claim 1, wherein none of the joints members has inactive joints.

7. The manipulator according to claim 1, wherein said relationship is equal for a linear displacement of any one of the first joint members and a displacement output of the moving portion.

8. A method for controlling movement of a moving portion of a manipulator in any of three translational degrees of freedom, comprising the steps of:

providing a manipulator having a moving portion being supported by at least three articulated support legs each extending between the moving portion and a ground, each of the articulated support legs being connected to the ground by a first joint member and to the moving portion by a second joint member, the first joint member and the second joint member of each of the articulated support legs being interconnected by at least a third joint member, the articulated support legs each having at least one rotational degree of freedom and having constraints in the joint members operable to restrict movement of the moving portion to three translational degrees of freedom and to constrain a relationship between linear displacement of the first joint members and output of the moving portion to be linear;

providing at least three linear degrees of actuation to the manipulator by connecting an actuator to each of the first joint members;

receiving a displacement signal for a given position of the moving portion;

calculating control signals for the actuators of the first joint members using a linear function of said displacement signal; and displacing the moving portion to the given position by controlling the three degrees of actuation in accordance with said control signals.

9. The method according to claim 8, wherein the second joint members are revolute joints, the axes of the revolute joints of the second joint members being orthogonal with one another.

10. The method according to claim 8, wherein the second and third joint members each are revolute joints, the axes of the revolute joints in a same one of the legs are parallel to one another, and the axes of the revolute joints of the second joint members are orthogonal with one another.

11. The method according to claim 10, wherein each of the first joint members is any one of a cylindrical joint with an axis parallel to the axes of the revolute joints of the same leg, and a combination of a revolute joint and of a prismatic joint with an axis of the revolute joint of the first joint member parallel to the axes of other ones of the revolute joints of a same one of the legs.

12. The method according to claim 11, wherein each of the first joint member is a combination of a revolute joint and of a prismatic joint, with translation directions of the prismatic joints being parallel to one another.

13. The method according to claim 8, wherein none of the joints members has inactive joints.

14. The method according to claim 8, wherein a relationship between a linear displacement of any one of the first joint members and a resulting displacement output of the moving platform is equal for all the first joint members.

* * * * *